Nov. 27, 1956 C. A. ESCOFFERY 2,772,382
RECTIFIER ASSEMBLY WITH AIR COOLING FINS
Filed May 31, 1955
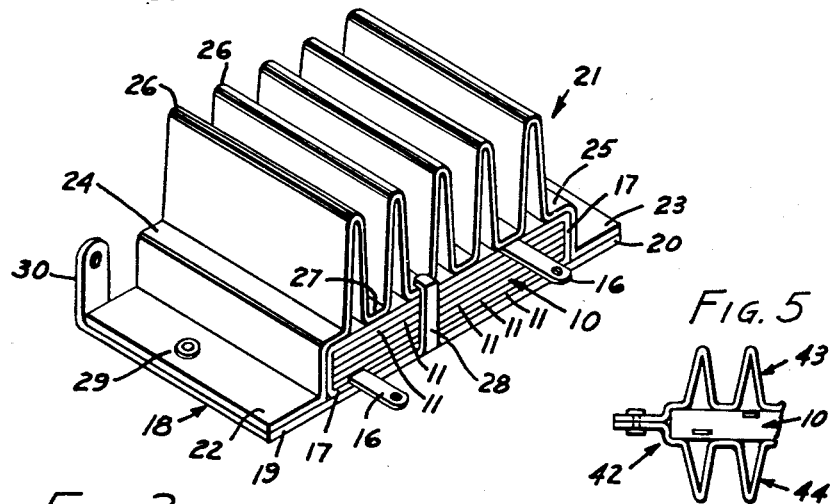
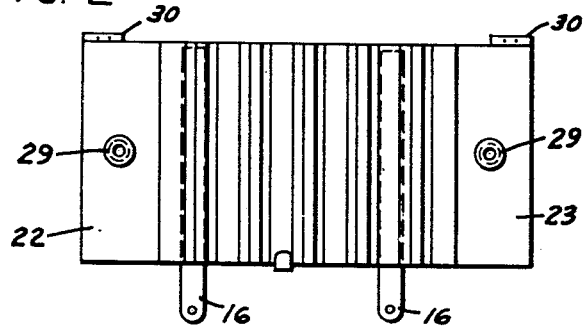
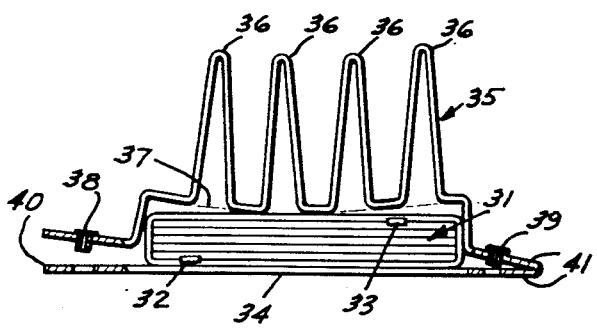
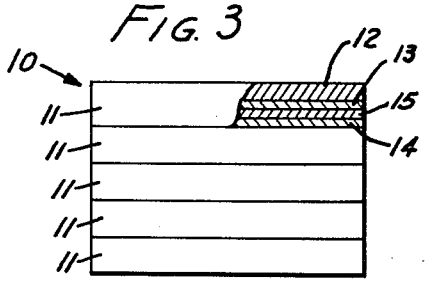
INVENTOR.
CHARLES A. ESCOFFERY
BY
D. Gordon Angus
ATTORNEY.

United States Patent Office 2,772,382
Patented Nov. 27, 1956

2,772,382

RECTIFIER ASSEMBLY WITH AIR COOLING FINS

Charles A. Escoffery, Los Angeles, Calif., assignor to International Rectifier Corporation, Los Angeles, Calif., a corporation of California Application May 31, 1955, Serial No. 511,880

3 Claims. (Cl. 317—234)

This invention relates to dry plate rectifiers, and has for an object to provide a rectifier which is of simple construction and which is provided with means for dissipation of heat developed by the passage of electric current through the rectifier.

An additional object of the invention is to provide a rectifier construction in which certain elements of conventional dry plate rectifiers, such as spring contact washers and the like, can be omitted.

This invention is carried out by providing a plurality of flat rectifier plates of conventional design which are placed in conductive relationship with each other. These plates may simply be laid flat against each other without the interposition of spring contact washers and the like, if desired. A binder is provided which comprises a member disposed on each side of the rectifier stack which members are fastened together so as to enclose and compress the rectifier plates.

A feature of the invention resides in providing cooling fins on one of said members.

According to a preferred but optional feature of the invention, the cooling fins are created simply by corrugating the member.

The above and other features of this invention will be fully understood from the following detailed description and the accompanying drawings, of which:

Fig. 1 is a perspective view of a rectifier according to the invention;

Fig. 2 is a top view of Fig. 1;

Fig. 3 is an elevational detail, partly in cross section, of the stack of rectifier plates in Fig. 1;

Fig. 4 is a side elevation of another form of rectifier construction according to the invention in its unassembled condition; and Fig. 5 is a side elevation of still another form of rectifier construction according to the invention.

Fig. 1 shows the presently preferred embodiment of the invention. A rectifier stack 10 comprises a plurality of flat rectifier plates 11 in stacked abutting relationship with each other. These plates are all similar, and the detailed construction of one of them is shown in Fig. 3. Each rectifier plate 11 has a metal base plate 12 with a semi-conducting layer 13 of some suitable semi-conducting metal such as selenium applied to one side thereof. The semi-conducting layer 13 is itself coated with a conductive metal 14 which acts as a counter electrode. The counter electrode may be of a suitable alloy, such as one consisting of 68.5% tin and 31.5% cadmium, which may be sprayed on to the semi-conducting layer. By an electroforming treatment familiar in the art, a barrier layer 15 is formed between the semi-conducting layer (the active electrode) and the counter electrode. The semi-conducting layer, the barrier layer, and the counter electrode are shown relatively thicker than they actually are with respect to the size of the base plate for purposes of illustration.

When the rectifier plates are stacked together, the base plate of one of said rectifier plates will abut the counter electrode of its neighbor, and it is unnecessary to provide spring contact washers and the like to interconnect the rectifier plates. In this manner, the full area of the rectifier plates is available for straight-through conduction.

Terminal lugs 16 are placed against the top and bottom of the stack of rectifier plates.

The stack of rectifier plates and the lugs are enclosed by a wrapper 17 of a suitable insulating material, such as paper or the like. This wrapper may also be provided in the form of an encapsulating layer of paint, resin, or the like, in which the stack can be embedded.

The stack is then finally bound together by a binder comprising a lower base member 18 with flanges 19 and 20, and an upper member 21, which is provided with flanges 22 and 23. The upper member 21 is bent to form shoulders 24 and 25 around the upper edges of the rectifier stack, and it also has a plurality of fins in the form of corrugations 26. These corrugations are preferably U-shaped so as to be open at the inside of their bends to provide an augmented area of radiating surface. The corrugations also preferably have flat bottoms 27 in contact with the rectifier stack. A clip tab 28 serves to bind the members together near the center of the rectifier assembly, and eyelets 29 may be provided for joining the flanges 19 and 22, and 20 and 23, together. These eyelets preferably have open centers so that the rectifier assembly may conveniently be mounted by means of screws or the like.

In addition, side flaps 30 are provided which may simply comprise a bent-up portion of one of the members. These side flaps provide for mounting the rectifier by its side instead of by its base.

Another embodiment of a rectifier according to the invention is shown in Fig. 4, in which the corrugations of the upper member are so disposed and arranged that they will serve to further compress the rectifier stack when the rectifier is assembled. In this embodiment, a rectifier stack 31 which is similar in every respect to the rectifier stack 10, and which has terminal lugs 32 and 33 has a binder comprising a lower member 34 and an upper member 35. If desired, the lower member 34 and upper member 35 may be formed from a single bent piece of metal as shown.

Corrugations 36 in the upper member at the outer ends of the rectifier assembly are taller than those at the center of the rectifier when the rectifier is unassembled. This effect results from a curvature of the central portion of the upper member. When the ends of the corrugation are pressed toward each other when the flanges are tightened together, a vertically downward force will be exerted against the rectifier stack by the upper member, and then the corrugations can, if desired, all be of substantially the same height. This eliminates the need for clips to hold the assembly together.

Eyelets 38, 39 are provided for joining the flanges 40 and 41 respectively thereby firmly assembling the rectifier.

In Fig. 5 there is shown a rectifier 42 with rectifier stack 10, terminals, and wrapper as in the embodiments of Figs. 1 and 4. A binder comprising a pair of corrugated members 43, 44 is provided for assembling the rectifiers in like manner as shown in Figs. 1 and 4. Thus corrugations or fins can be provided on either or both of the members of the binder.

The binding means disclosed herein provide a rectifier assembly which is simple and inexpensive to manufacture. As an example of the simplification and lowered cost which results, it has been found that with this construction no spring contacts or other compressing contact means need be provided for radio-type selenium stacks, since the binder serves to exert the needed force on the stack. This assembly also dispenses with such requirements of conventional rectifiers as central binding posts and the like which require holes in the rectifier plates and which thus reduce the useful area of the rectifier plate for a plate of given size. A more efficient rectifier for a given bulk can thereby be made by the use of the structure of this invention.

The cooling fins have been found to be very effective in the dissipation of heat so that a cheap and effective rectifier of a given capacity can be provided with smaller overall dimensions. This results in space-saving as well as monetary savings in manufacturing labor and material. This construction is rugged and quite shake proof. In addition, it will be appreciated that all, or any part of this rectifier can be encapsulated, thereby providing an even more rugged assembly.

This invention is not to be limited by the embodiments shown in the drawings and described in the description which are given by way of illustration and not of limitation, but only in accordance with the scope of the appended claims. It will further be understood that the terms "corrugated," "corrugation," "finned" and "fin" have been used interchangeably, and relate to an extension of the binder members for increasing the heat transfer area.

I claim:

1. A dry plate rectifier comprising a rectifier stack of flat rectifier plates in conductive connection, a pair of terminal lugs, one terminal lug being on each side of said rectifier stack in conductive contact therewith, a wrapper of insulating material around the stack and lugs, a binder for said wrapped stack and lugs comprising a member on each side of said stack of lugs, said members being bound together to enclose said stack and lugs, at least one of said members being corrugated so as to form fins which radiate heat from the rectifier stack, and means for fastening said members together so as to bind and compress the rectifier stack.

2. A rectifier according to claim 1 in which the corrugations have flat bottoms which are in thermally conductive contact with the rectifier stack.

3. A rectifier according to claim 1 in which the corrugations at the outer edges of the rectifier are taller than those at the center when the rectifier is unassembled whereby fastening the members together pulls all of said corrugations against the rectifier stack to exert a compressive force thereon.

References Cited in the file of this patent
UNITED STATES PATENTS

| | | |
|---|---|---|
| 1,718,663 | Ogden | June 25, 1929 |
| 2,117,020 | Conrad | May 10, 1938 |